No. 721,038. PATENTED FEB. 17, 1903.
W. N. HARING.
WHEEL.
APPLICATION FILED OCT. 31, 1902.
NO MODEL. 3 SHEETS—SHEET 1.

Witnesses Inventor
William N. Haring,
By Victor J. Evans
Attorney

No. 721,038. PATENTED FEB. 17, 1903.
W. N. HARING.
WHEEL.
APPLICATION FILED OCT. 31, 1902.
NO MODEL. 3 SHEETS—SHEET 2.
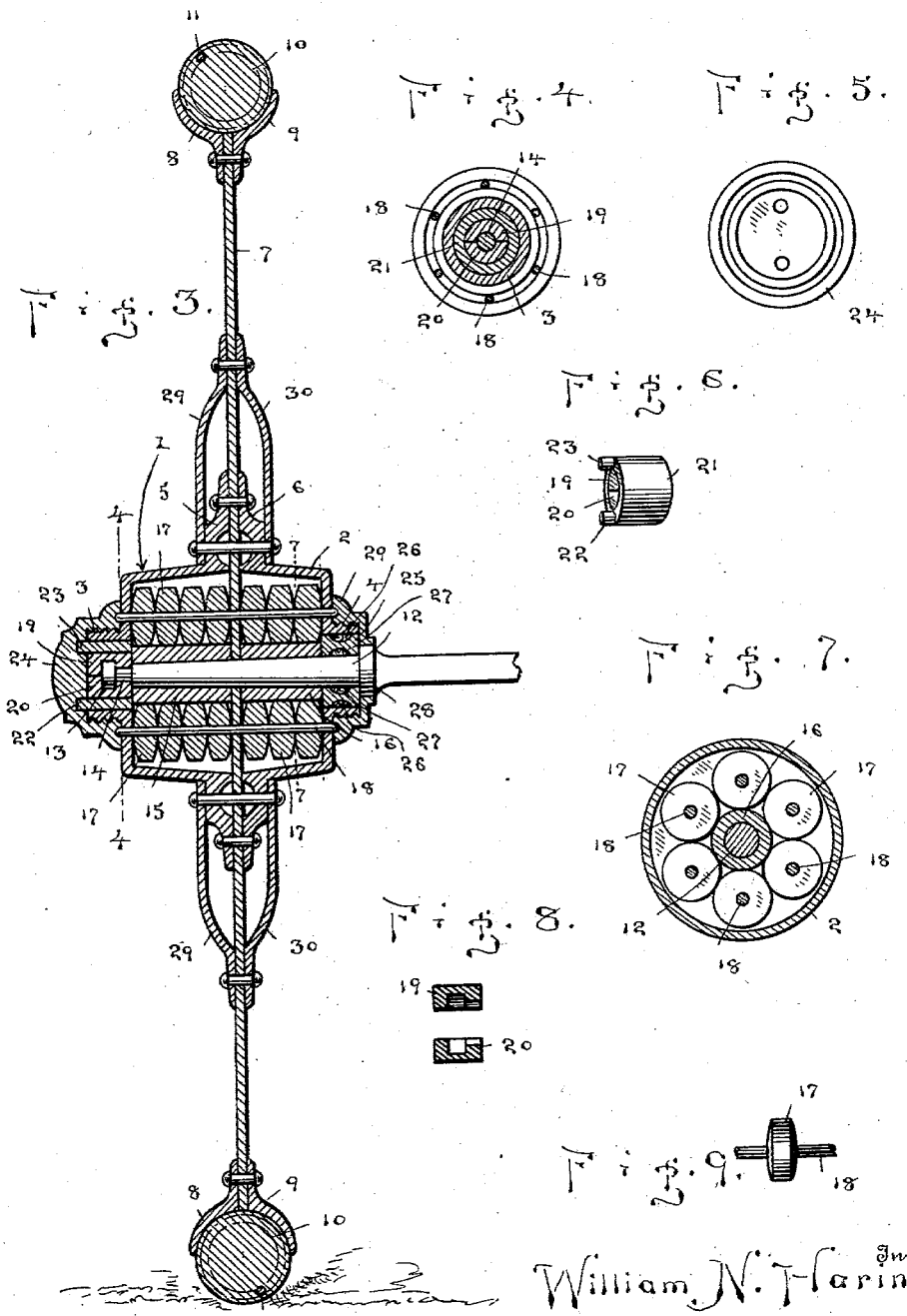
Witnesses
Inventor
William N. Haring.
By Victor J. Evans
Attorney

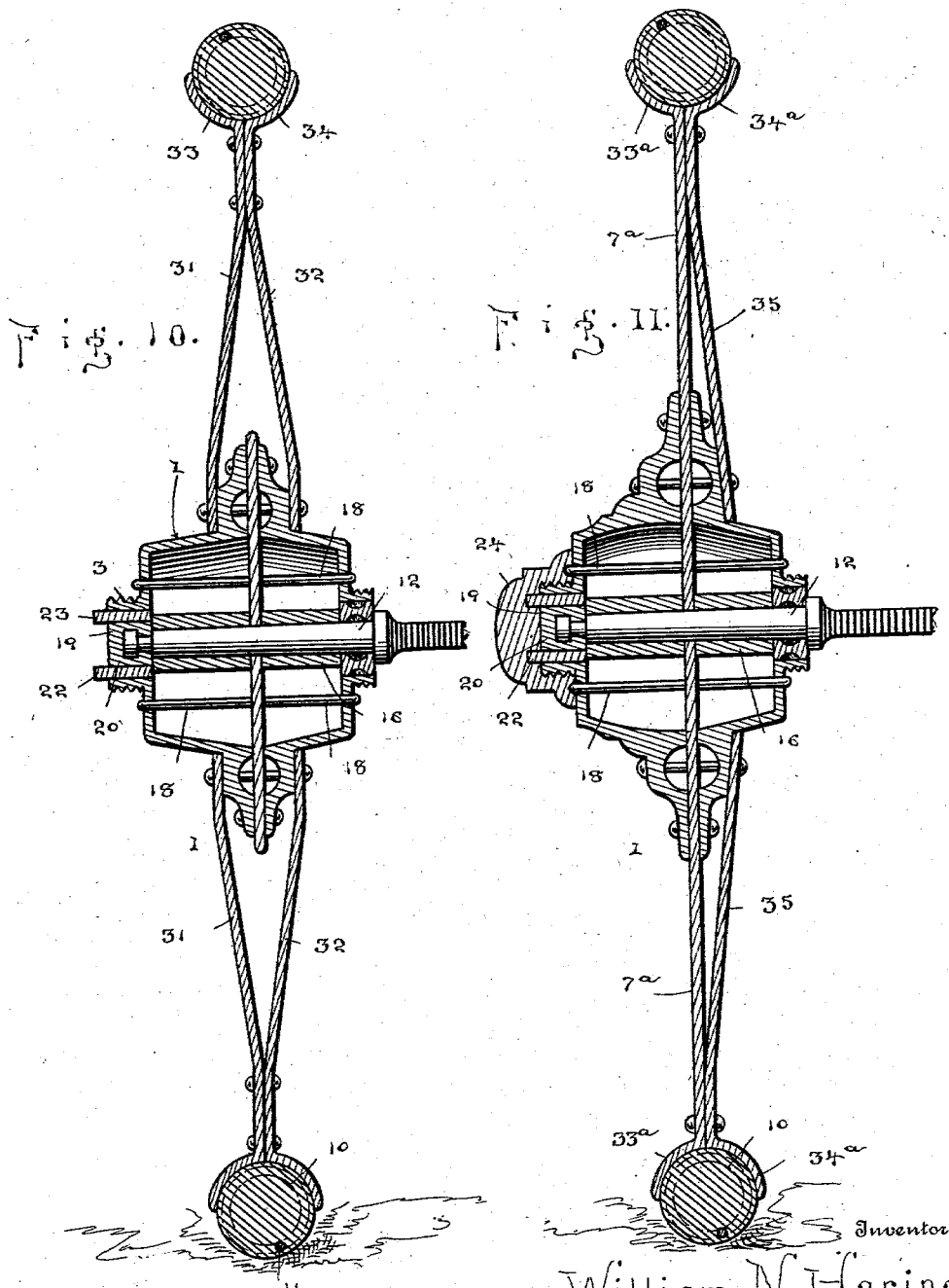

UNITED STATES PATENT OFFICE.

WILLIAM N. HARING, OF NYACK, NEW YORK.

WHEEL.

SPECIFICATION forming part of Letters Patent No. 721,038, dated February 17, 1903.

Application filed October 31, 1902. Serial No. 129,609. (No model.)

*To all whom it may concern:*

Be it known that I, WILLIAM N. HARING, a citizen of the United States, residing at Nyack, in the county of Rockland and State of New York, have invented new and useful Improvements in Wheels, of which the following is a specification.

This invention relates to wheels; and the object thereof is to provide a cheap, durable, and efficient construction of wheel which will combine lightness with the maximum amount of strength.

The construction of parts and combinations of parts of which the invention is composed will be specifically referred to hereinafter, reference being had to the accompanying drawings, in which—

Figure 1:
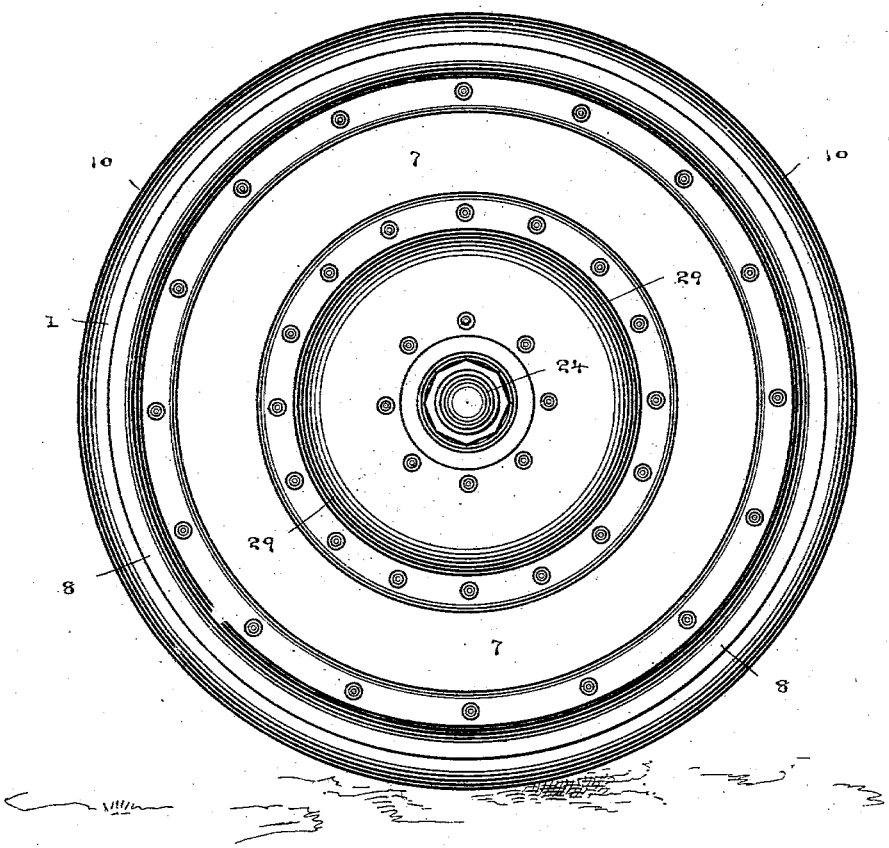
Figure 2:
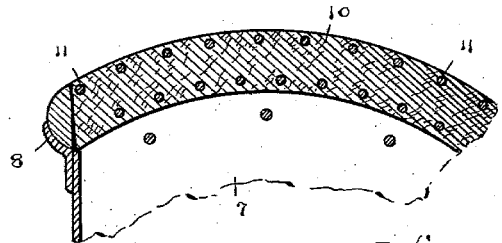

Figure 1 is a side elevation of a wheel constructed in accordance with my invention. Fig. 2 is a fragmentary sectional view of a portion of a tire, felly, and web. Fig. 3 is a vertical longitudinal sectional view through a wheel constructed in accordance with my invention. Fig. 4 is a vertical sectional view on the line 4 4 of Fig. 3. Fig. 5 is a view in elevation of the nut. Fig. 6 is a detail perspective view of a locking-thimble for securing the hub to the axle. Fig. 7 is a vertical sectional view on the line 7 7 of Fig. 3. Fig. 8 is a detail sectional view of a sectional nut fitted on the axle and held in position by the thimble. Fig. 9 is a side elevation of one of the antifriction-bearings. Fig. 10 is a vertical cross-sectional view through a modified form of wheel. Fig. 11 is a similar view of a still further modified form.

In the preferred form of the invention illustrated in Figs. 1 to 3, inclusive, the wheel comprises a hub having two coinciding tubular portions 1 and 2. Each section comprises a tubular member having a restricted neck 3 or 4. The necks 3 and 4 are of course oppositely disposed to each other and are threaded exteriorly. At the inner meeting edges of the sections 1 and 2 are parallel outwardly-projecting collars or peripheral flanges 5 and 6, interposed between which is a web 7, to which the flanges are secured by suitable rivets. The web is circular in elevation and carries on its circumferential edges a pair of parallel jaws 8 and 9, which when riveted together form a concave groove, into which is secured a tire 10, of resilient material, which can consist of rubber, cement, or any suitable substance, the component parts of which may be held together by interposed wires or fibers 11. The web 7 extends entirely through the hub and into the cylindrical chamber or barrel formed by the members 1 and 2, and said web is provided with a concentric opening through which projects an axle 12, on the free end of which is a circumferential head 13, connected to the axle by a reduced portion 14. Surrounding the axle and spaced apart by the web are two sleeves 15 and 16, which are confined within the barrel and bear against a plurality of antifriction bearings or rollers 17, which are arranged in circular series concentric with the sleeves and supported on shafts 18, whereby the friction will be materially reduced. The hub is secured to the axle by a sectional nut, comprising two semicylindrical members 19 and 20, which when brought together envelop the head 13 of the axle. These members 19 and 20 are held in their relative locked position by means of a thimble 21, which is of approximately the same diameter exteriorly as the interior diameter of the restricted neck 3. The thimble is also provided with outwardly-projecting lugs or pins 22 and 23, which extend into recesses in the nut 24, which is internally threaded and is secured on the neck 3. Abutting against the sleeve 16 is a collar 25, which is provided with exterior and internal oppositely-disposed concave grooves 26 and 27, in which is arranged packing to lubricate and exclude the dust, dirt, and other foreign substances from contact with the interior mechanism of the hub. The collar 25 bears against the collar 28 on the axle, which is surrounded by a flange on the dust-guard 29, which is interiorly threaded and is secured on the neck 4. In order to give additional strength to the wheel, I arranged two reinforcing devices 29 and 30 on each side of the web to which they are secured and which are fastened to the flanges 6 and 7 of the hub, respectively. These reinforcing devices comprise two circular plates having concentric openings, so that they can fit over the hub-barrel, and they are slightly bowed and extend to a point midway between the hub and the felly.

In the modified form shown in Fig. 10 the antifriction-rollers are not employed and the web 7 only extends through to the outer edges of the flanges 5 and 6. Supplemental webs 31 and 32 are secured to the outer edges of the flanges and converge toward each other, meeting near their peripheries, and are provided with oppositely-curved flanges 33 and 34 to form a concave groove in which the tire is secured.

The form shown in Fig. 11 differs from the preferred form mainly in the fact that it cannot or need not employ the rubber bearings, and one side of the felly is formed integral with the web, which extends interiorly through the hub and to the outer edge of the wheel. A reinforcing-plate or supplemental web 35 is secured to one side of the flange 6 in this form and is connected to the web 7ª near its outer edge by suitable bolts or rivets. Both the webs 7ª and 35 are provided with outwardly-disposed curved flanges 33ª and 34ª, which form the felly, having a concave groove for the reception of the tire.

It will be obvious that a device constructed in accordance with either or all of the forms heretofore described and illustrated will afford a strong, durable, and efficient wheel, the hub of which will be materially strengthened, so as to withstand an abnormal strain.

Of course it will be obvious that other changes and modifications might be made from time to time without departing from the spirit of this invention, and I reserve the right to make such changes as would properly suggest themselves to the ordinary mechanic.

Having thus described the invention, what is claimed as new, and desired to be secured by Letters Patent, is—

1. A wheel comprising a tubular hub, an axle therein, a web extending entirely through the hub and arranged intermediate the ends, a tire carried by the periphery of the web, sleeves on the axle on either side of the web, a head on the end of the axle, and means within the hub for engaging the head, whereby the axle will be locked with relation to the hub.

2. A wheel comprising a tubular hub, an axle therein, a web extending entirely through the hub and arranged intermediate the ends, a tire carried by the periphery of the web, sleeves on the axle on either side of the web, a head on the end of the axle, a sectional nut engaging the head of the axle, and a thimble formed within the hub to hold the nut in engagement with the head.

3. In a wheel, the combination with a tubular hub, of a web extending through the hub and intermediate the ends thereof, an axle projecting through the hub and through an opening in the web, a sleeve on the axle, and means within the hub for engaging the end of the axle and adapted to bear against the sleeve whereby the axle will be locked to the hub.

4. A wheel having a tubular hub, a web interposed between the ends of the hub, an axle extending into the hub through the web, and a locking means on the end of the axle and bearing against the web, whereby the axle will be held in locked relation to the hub.

5. A wheel having a tubular hub, a web extending entirely through the hub and intermediate the ends thereof, said web having an opening concentric therein for the insertion of an axle, sleeves having coinciding openings alining with the opening in the web, and antifriction-bearings arranged within the hub and in circular series against which the sleeves bear.

In testimony whereof I affix my signature in presence of two witnesses.

WILLIAM N. HARING.

Witnesses:
PHILIP J. DOUZAPH,
W. K. COLSEY, Jr.